United States Patent

Nakai et al.

(10) Patent No.: US 12,744,199 B2

(45) Date of Patent: Sep. 22, 2026

(54) IMPURITY PROCESSING DEVICE AND IMPURITY PROCESSING METHOD

(71) Applicant: Panasonic Intellectual Property Management Co., Ltd., Osaka (JP)

(72) Inventors: Miyuki Nakai, Osaka (JP); Yuko Ogawa, Osaka (JP); Toshiro Kume, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1005 days.

(21) Appl. No.: 17/801,182

(22) PCT Filed: Jan. 21, 2021

(86) PCT No.: PCT/JP2021/001966

§ 371 (c)(1), (2) Date: Aug. 19, 2022

(87) PCT Pub. No.: WO2021/166536

PCT Pub. Date: Aug. 26, 2021

(65) Prior Publication Data

US 2023/0101754 A1 Mar. 30, 2023

(30) Foreign Application Priority Data

Feb. 21, 2020 (JP) ................................ 2020-028258

(51) Int. Cl.

*H01M 4/04* (2006.01)
*B03C 5/00* (2006.01)
*H01M 4/139* (2010.01)

(52) U.S. Cl.

CPC ............ *H01M 4/0438* (2013.01); *B03C 5/00* (2013.01); *H01M 4/0404* (2013.01); *H01M 4/0409* (2013.01); *H01M 4/139* (2013.01)

(58) Field of Classification Search

CPC ..... B03C 5/00; H01M 4/0438; H01M 4/0404; H01M 4/0409; H01M 4/139

See application file for complete search history.

(56) References Cited

U.S. PATENT DOCUMENTS 8,470,056 B2 6/2013 Takeno et al.
9,406,967 B2 8/2016 Fujimaki et al.
(Continued)

FOREIGN PATENT DOCUMENTS

CN 101542783 A 9/2009
CN 103262327 A 8/2013
(Continued)

OTHER PUBLICATIONS

International Search Report dated Apr. 13, 2021, issued in counterpart International Application No. PCT/JP2021/001966, w/English translation (4 pages).

(Continued)

*Primary Examiner* — Ciel P Contreras

(74) *Attorney, Agent, or Firm* — WHDA, LLP

(57) ABSTRACT

An impurity processing device is a device for processing metal impurities contained in a solid-liquid mixture for forming an electrode of an electric storage device, and includes a first electrode and a second electrode that apply an electric field to the solid-liquid mixture, and a power supply that causes a current of 0.1 mA or more to flow between the first electrode and the second electrode.

1 Claim, 8 Drawing Sheets

(56) References Cited

U.S. PATENT DOCUMENTS

| | | | | |
|---|---|---|---|---|
| 2004/0195112 | A1 | 10/2004 | Weakly et al. | |
| 2009/0288289 | A1* | 11/2009 | Takeno | H01M 10/052 29/623.1 |
| 2013/0255075 | A1 | 10/2013 | Fujimaki et al. | |

FOREIGN PATENT DOCUMENTS

| | | | | |
|---|---|---|---|---|
| JP | 2000-309894 | A | | 11/2000 |
| JP | 2006-291345 | A | | 10/2006 |
| JP | 2007136284 | A | * | 6/2007 |
| JP | 2008-277196 | A | | 11/2008 |
| JP | 2010-138039 | A | | 6/2010 |
| JP | 2015-079610 | A | | 4/2015 |
| WO | 2008/090915 | A1 | | 7/2008 |
| WO | 2014/142045 | A1 | | 9/2014 |

OTHER PUBLICATIONS

Extended (Supplementary)European Search Report dated Jul. 13, 2023, issued in counterpart EP Application No. 21756929.2. (16 pages).

* cited by examiner

FIG. 8

| CURRENT WAVEFORM | FREQUENCY [Hz] | CURRENT VALUE [mA] | COPPER ELUTION | ALTERATION OF SOLID-LIQUID MIXTURE | VOLTAGE VALUE [V] |
|---|---|---|---|---|---|
| CONTINUOUS | | 0.1 | PRESENCE | ABSENCE | 14 |
| CONTINUOUS | | 0.1 | PRESENCE | ABSENCE | 45 |
| CONTINUOUS | | 0.5 | PRESENCE | ABSENCE | 22 |
| INTERMITTENT | 0.1 | 3 | PRESENCE | ABSENCE | 23 |
| CONTINUOUS | | 3 | PRESENCE | PRESENCE | 23 |
| INTERMITTENT | 0.1 | 5 | PRESENCE | ABSENCE | 16 |
| INTERMITTENT | 0.1 | 10 | PRESENCE | ABSENCE | 20 |
| CONTINUOUS | | 10 | PRESENCE | PRESENCE | 20 |
| RECTANGULAR WAVE | 0.01 | 1 | PRESENCE | PRESENCE | 74 |
| RECTANGULAR WAVE | 0.1 | 1 | PRESENCE | ABSENCE | 74 |
| SINE WAVE | 0.01 | 1 | PRESENCE | PRESENCE | 78 |
| SINE WAVE | 0.1 | 1 | PRESENCE | ABSENCE | 78 |
| SINE WAVE | 0.1 | 5 | PRESENCE | ABSENCE | 27 |
| SINE WAVE | 0.1 | 10 | PRESENCE | ABSENCE | 53 |
| SINE WAVE | 1 | 1 | PRESENCE | ABSENCE | 78 |
| SINE WAVE | 10 | 1.4 | PRESENCE | ABSENCE | 90 |
| SINE WAVE | 60 | 0.5 | PRESENCE | ABSENCE | 265 |

IMPURITY PROCESSING DEVICE AND IMPURITY PROCESSING METHOD

CROSS-REFERENCE TO RELATED APPLICATIONS

This application is based upon and claims the benefit of priority from the prior Japanese Patent Application No. 2020-028258, filed on Feb. 21, 2020, and the International Patent Application No. PCT/JP2021/001966, filed on Jan. 21, 2021, the entire content of each of which is incorporated herein by reference.

BACKGROUND

Field of the Invention

The present disclosure relates to an impurity processing device and an impurity processing method.

Description of the Related Art

When a solid-liquid mixture having electron conductivity is prepared, metal particles may be mixed as impurities. When the solid-liquid mixture is used for an electronic device, there is a possibility that defects of the electronic device are caused by the impurities. Examples of the electronic device include electric storage devices such as a lithium-ion battery, a lithium-ion secondary battery, an alkaline dry battery, an electric double layer capacitor, and an electrochemical capacitor. Examples of the solid-liquid mixture include electrode slurries used in these electric storage devices. When metal impurities are mixed in the electrode slurry, the metal impurities may cause a short circuit between positive and negative electrodes or the like. On the other hand, for example, Patent Literature 1 discloses a method for magnetically removing metal foreign substances contained in an aqueous slurry containing an electrode active material and a particulate binder.

Patent Literature 1: WO 2014/142045 A

In the conventional method for removing the metal impurities using magnetism, impurities made of a nonmagnetic metal cannot be removed. Therefore, in the conventional method, a treatment rate of impurities is insufficient.

SUMMARY OF THE INVENTION

One aspect of the present disclosure is an impurity processing device. This device is an impurity processing device for processing metal impurities contained in a solid-liquid mixture for forming an electrode of an electric storage device, and includes a first electrode and a second electrode that apply an electric field to the solid-liquid mixture, and a power supply that causes a current of 0.1 mA or more to flow between the first electrode and the second electrode.

Another aspect of the present disclosure is an impurity processing method. This method is an impurity processing method for processing metal impurities contained in a solid-liquid mixture for forming an electrode of an electric storage device, and includes causing a current of 0.1 mA or more to flow between a first electrode and a second electrode applying an electric field to the solid-liquid mixture.

Any combinations of the above components and modifications of the expressions of the present disclosure among methods, apparatuses, systems, and the like are also effective as aspects of the present disclosure.

BRIEF DESCRIPTION OF DRAWINGS

Embodiments will now be described, by way of example on with reference to the accompanying drawings which are meant to be exemplary, not limiting, and wherein like elements are numbered alike in several Figures, in which:

FIG. 8 is a diagram illustrating experimental data when various kinds of currents are caused to flow to a solid-liquid mixture for one hour.

DETAILED DESCRIPTION OF THE INVENTION

Figure 1:
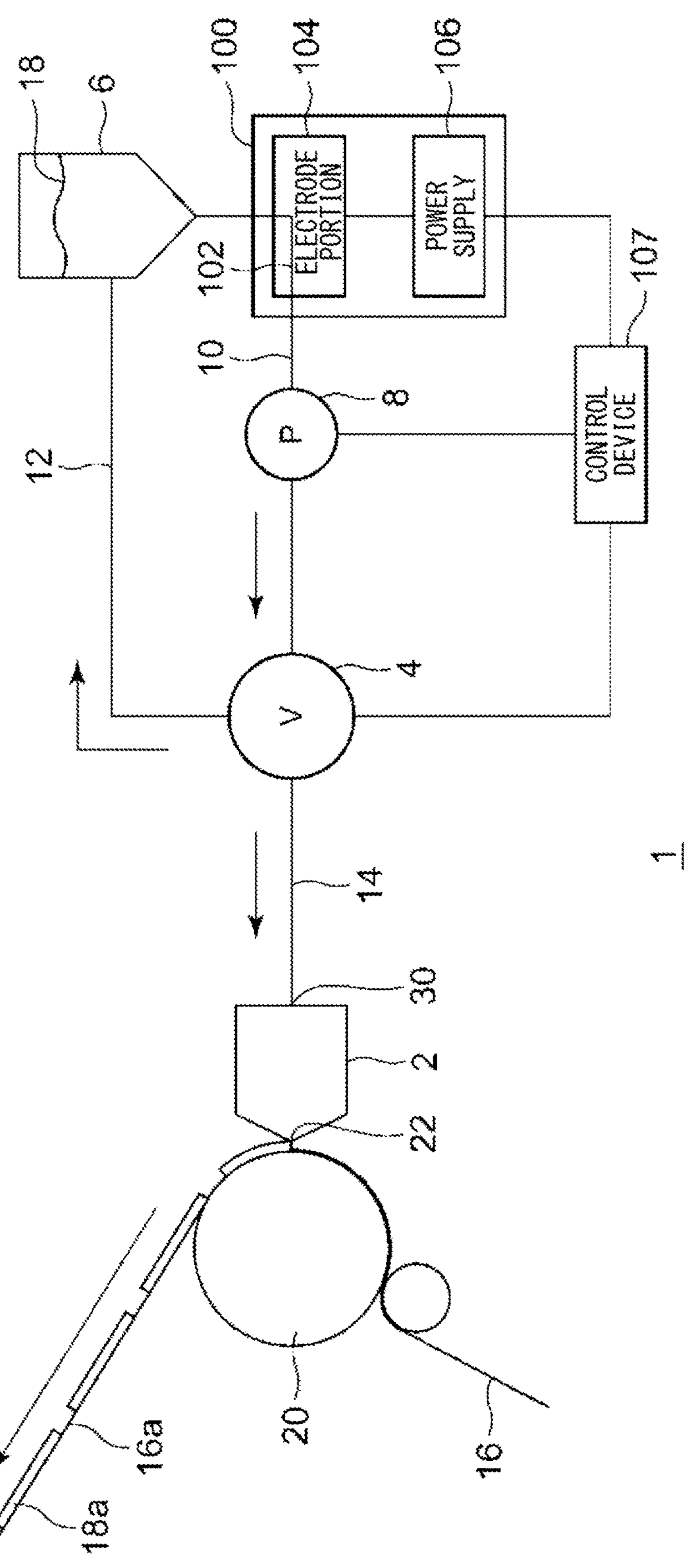
FIG. 1 is a schematic diagram of a coating apparatus including an impurity processing device according to a first embodiment.

Hereinafter, the present disclosure will be described on the basis of preferred embodiments while referring to the drawings. The embodiments do not limit the present disclosure, but are exemplary, and all features and combinations thereof described in the embodiments necessarily essential to the present disclosure. The same or equivalent components members, and processes illustrated in the drawings will be denoted by the same reference numerals, and repeated description will be omitted as appropriate.

In addition, the scale or shape of each component illustrated in the drawings set for the sake of convenience to facilitate the explanation and is not to analyzed as limitative unless otherwise specified. In addition, when the terms "first", "second", and the like are used in the present specification or claims, such terms do not represent any order or degree of importance and are used to distinguish one configuration from another configuration, unless otherwise specified. In addition, in each drawing, some of members that are not important for describing the embodiment are omitted.

First Embodiment

FIG. 1 is a schematic diagram of a coating apparatus including an impurity processing device according to a first embodiment. A coating apparatus 1 includes a coating die 2, a valve 4, a tank 6, a pump 8, a feed pipe 10, a return pipe 12, and a die supply pipe 14.

The coating die 2 is a tool for applying a coating material 18 to a coated material 16. As an example, the coating apparatus 1 of the present embodiment is used for manufacturing an electrode plate of a secondary battery. The electrode plate of the secondary battery is a sheet-shaped electrode material obtained by applying an electrode slurry to a current collector and the electrode slurry. Therefore, in the present embodiment, the coated material 16 is a current collector of the secondary battery, and the coating material 18 is an electrode slurry of the secondary battery. The current collector is, for example, a metal foil. The electrode slurry is an electron conductive solid-liquid mixture containing an electrode an electrode active material and a solvent. In the case of a general lithium-ion secondary battery, a positive electrode plate is prepared by applying an electrode slurry containing a positive electrode active material such as lithium cobalt oxide or lithium iron phosphate on an aluminum foil. In addition, a negative electrode plate is prepared by applying an electrode slurry containing a negative electrode active material such as graphite on a copper foil.

The coating die 2 is disposed such that a discharge port 22 faces a circumferential surface of a backup roll 20 with a predetermined distance therebetween. The coated material 16 is continuously conveyed to a position where the backup roll 20 and the discharge port 22 face each other by the rotation of the backup roll 20.

The valve 4 is connected to the coating die 2 via the die supply pipe 14. The valve 4 can switch between supply and non-supply of the coating material 18 to the coating die 2. The coating apparatus 1 can discharge the coating material 18 from toe coating die 2 to the coated material 16 while the coating material 18 is supplied to the coating die 2. The tank 6 is connected to the valve 4 via the feed pipe 10 and the return pipe 12.

The tank 6 stores the coating material 18. The feed pipe 10 includes the pump 8, and the coating material 18 is fed from the tank 6 to the valve 4 by driving of the pump 8. The valve 4 supplies the coating material 18 supplied from the tank 6 to the coating die 2 via the die supply pipe 14. Alternatively, the valve 4 returns the coating material 18 supplied from the tank 6 to the tank 6 via the return pipe 12.

The valve 4 supplies the coating material 18 to the coating die 2, so that the coating material 18 can be discharged from the coating die 2 to form an application portion 18*a* of the coating material 18 on the coated material 16. In addition, the valve 4 returns the coating material 18 to the tank 6, so that the application of the coating material 18 from the coating die 2 can be stopped to form a non-application portion 16*a* of the coating material 18 on the coated material 16. That is, intermittent coating of the coating material 18 can be performed on the coated material 16 by the valve 4. The non-application portion 16*a* is used for pasting of a center lead of an electrode or the like. Note that the configuration of each portion of the coating apparatus 1 not limited to that described above.

The coating apparatus 1 includes an impurity processing device 100 according to the present embodiment. The impurity processing device 100 includes a pipe 102, an electrode portion 104, and a power supply 106. The pipe 102 is a flow path through which a treated liquid containing metal impurities flows. In the present embodiment, a region of the feed pipe 10 between the tank 6 and the pump 8 constitutes the pipe 102. That is, the impurity processing device 100 is provided in the feed pipe 10. The coating material 18, in other words, the electrode slurry containing the solvent and the electrode active material corresponds to the treated liquid.

Note that the impurity processing device 100 may be provided in a region of the feed pipe 10 between the pump 8 and the valve 4. The impurity processing device 100 may be provided in the return pipe 12, the die supply pipe 14, or the like. Further, the coating apparatus 1 is not limited to an apparatus for manufacturing an electrode plate of a secondary battery, and the coated material 16 and the coating material 18 may not be an electrode plate and an electrode slurry. Further, the impurity processing device 100 may be provided in an apparatus other than the coating apparatus 1, for example, an apparatus for producing the treated liquid.

Figure 2A:
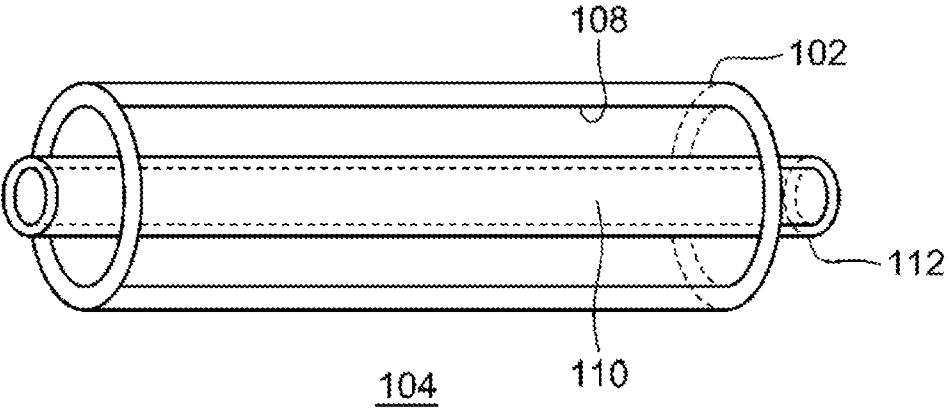
FIG. 2A is a perspective view schematically illustrating an electrode portion.
Figure 2B:
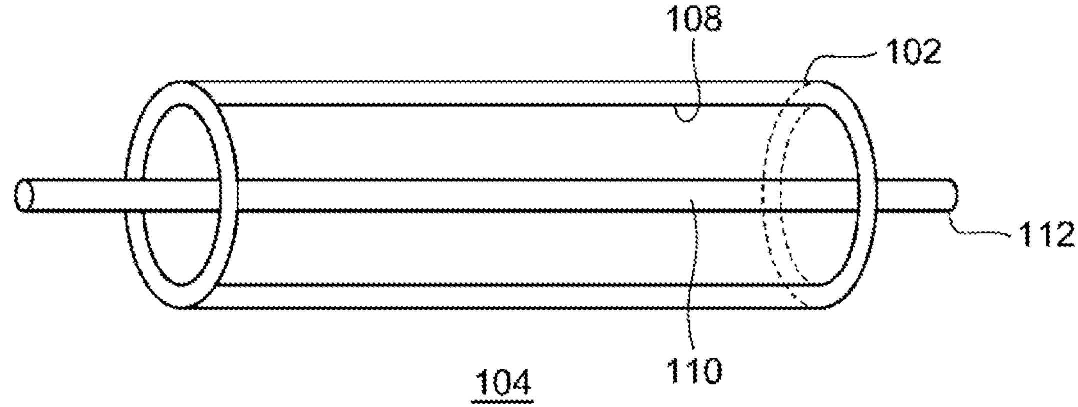
FIG. 2B is a perspective view schematically illustrating an electrode portion.
Figure 2C:
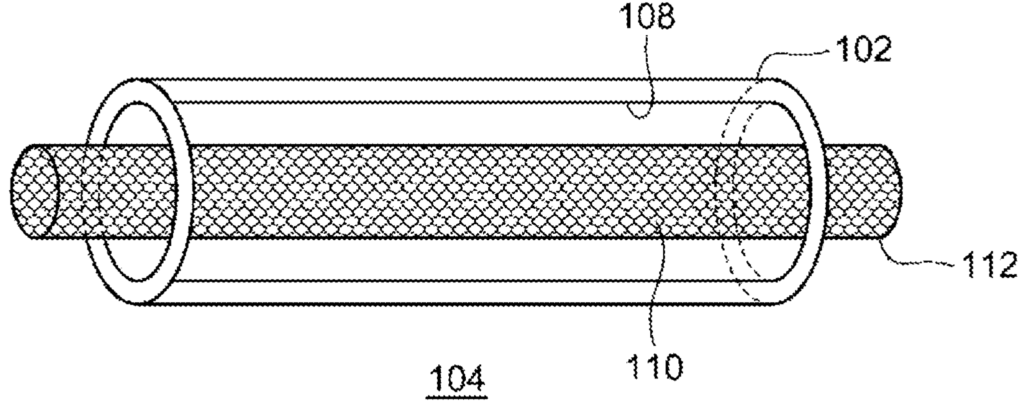
FIG. 2C is a perspective view schematically illustrating an electrode portion.

The electrode portion 104 in a first electrode 10 and a second electrode 110. FIGS. 2A to 2C are perspective views schematically illustrating the electrode portion 104. FIG. 2A is a first example of the electrode portion 104, FIG. 2B is a second example of the electrode portion 104, and FIG. 2C is a third example of the electrode portion 104. The first electrode 108 and the second electrode 110 are disposed in the pipe 102. The electrode portion 104 of the present embodiment has a rod-shaped body 112 inserted into the pipe 102. The first electrode 108 is provided on the pipe 102, and the second electrode 110 is provided on the rod-shaped body 112. The first electrode 108 and the second electrode 110 are insulated from each other.

The first electrode 108 and the second electrode 110 are made of a material having electrical conductivity. The material has, for example, a volume resistivity of 0.1 Ω·cm or less. Specific examples of the material constituting the first electrode 108 and the second electrode 110 include insoluble metals such as stainless steel, titanium, platinum, gold, niobium, and ruthenium, carbon, and the like. These materials can be appropriately combined.

The first electrode 108 is provided at least on an inner wall (inner circumferential surface) of the pipe 102. The first electrode 100 may be provided on the entire inner wall of the pipe 102 or may be provided on a part thereof. When the first electrode 108 is provided on the part of the inner wall, it may be a partial region in a flow direction of the treated liquid or a partial region in a circumferential direction of the 102. The entire pipe 102 may be made of an insoluble metal or the like, and the entire pipe 102 may constitute the first electrode 108. That is, the first electrode 108 may be provided only on a surface of the inner wall of the pipe 102 or may be provided even inside the inner wall.

The second electrode 110 is provided at least on an outer wall (outer circumferential surface) of the rod-shaped body 112. The second electrode 110 may be provided on the entire outer wall of the rod-shaped body 112 or may be provided on a part thereof. When the second electrode 110 is provided on the part of the outer wall, it may be a partial region in the flow direction of the treated liquid or a partial region in the circumferential direction of the rod-shaped body 112. The entire rod-shaped body 112 may be made of an insoluble metal or the like, and the entire rod-shaped body 112 may constitute the second electrode 110. That is, the second electrode 110 may be provided only on the surface of the outer wall of the rod-shaped body 112 may be provided even inside the outer wall.

In the first example it illustrated in FIG. 2A, the rod-shaped body 112 is a hollow body. The inside of the rod-shaped body 112 is sealed, and the treated liquid does not flow. In the second example illustrated in FIG. 2B, the rod-shaped body 112 is a solid body. By using the hollow or solid rod-shaped body 112 as the second electrode 110, it is possible to suppress an increase in pressure loss when the treated liquid passes through the pipe 102 due to the second electrode 110. On the other hand, in the third example illustrated FIG. 2C, the rod-shaped body 112 is a cylindrical mesh. The treated liquid can flow back and forth between the inside and the outside of the rod-shaped body 112 through an opening of the mesh while flowing through the pipe 102. By using the rod shaped body 112 made of the cylindrical mesh as the second electrode 110, a contact area between the second electrode 110 and the treated liquid can be increased, and a treatment rate of impurities by the impurity processing device 100 can be increased.

The power supply 106 causes a current to flow between the first electrode 108 and the second electrode 110. The power supply 106 can include a known DC/DC converter, DC/AC inverter, or the like. For example, the first electrode 108 is connected to a positive output terminal of the power supply 106, and the second electrode 110 is connected to a negative output terminal of the power supply 106. Therefore, the first electrode 108 is a positive electrode, and the second electrode 110 is a negative electrode. Note that the first electrode 108 may be a negative electrode, and the second electrode 110 may be a positive electrode. The current flowing from the power supply 106 may be a direct current or an alternating current. In addition, an amount of current flowing from the power supply 106 is, for example, 0.1 mA or more and 12 mA or less.

By applying a voltage from the power supply 106 to the first electrode 108 and the second electrode 110 and causing a current to flow to the treated to generate an electric field in the pipe 102, metal impurities in the treated liquid can be ionized and miniaturized. The metal impurities contained in the electrode slurry may have a size of about several 100 μm, but can be miniaturized to a size of 10 μm or less by energizing the treated liquid. The present inventors have confirmed that when a current is caused to flow to a treated liquid containing a copper wire as a metal impurity model, the mass of the copper wire linearily decreases with an increase, in the amount of electricity that is, the metal impurities are miniaturized. In addition, it has been confirmed that the metal impurities can be miniaturized even when either a direct current or an alternating current is caused to flow.

In addition, by generating the electric field it the pipe 102 by the power supply 106, the metal impurities can be ionized and electrodeposited on the surface of the first electrode 108 or the second electrode 110. As a result, the metal impurities can be removed from the treated liquid. Note that the direct current is more suitable for miniaturization of the metal impurities, and the alternating current is more suitable for electrodeposition of the metal impurities. Conditions for electrodeposition of the metal impurities on the electrode surface can be appropriately set by those skilled in the art.

By miniaturizing or removing the metal impurities, it is possible to suppress the metal impurities from causing a short circuit between the positive and negative electrodes. In addition, in an electric storage device in which an electrolytic solution is interposed between positive and negative electrodes, when a positive electrode slurry contains metal impurities, the metal impurities may be eluted into the electrolytic solution during charging of the electric storage device, reduced on a surface of the negative electrode, and deposited. When the deposition is repeated, the metal impurities grow in a dendrite shape and pass through a separator to reach the positive electrode, which causes a short circuit. The short circuit caused by the dendrite is more likely to occur when the size of the metal impurity is larger. Therefore, by miniaturizing or removing the metal impurities, the short circuit caused the dendrite can also be suppressed. Therefore, by applying a current to the treated liquid by the impurity processing device 100, it is possible to remove the metal impurities in the treated liquid, and it is possible to convert the treated liquid into a form in which the performance of the electric storage device is hardly adversely affected even if the metal impurities remain in the treated liquid.

The application of the voltage from the power supply 106 is controlled by a control device 107 as an example. The control device 107 is realized by an element or circuit such as a CPU or a memory a computer as a hardware configuration, and is realized by a computer program or the like as a software configuration. Those skilled in the art will understand that these functional blocks can be realized various forms by combining hardware and software. The control device 107 controls the power supply 106 on the basis of, for example, a value of the current flowing from the power supply 106 and a time for causing the current to flow. In this case, the control device 107 constitutes a part of the impurity processing device 100. Note that on/off of the power supply 106 may be controlled without depending on the control device 107. The control device 107 may control the valve 4 and the pump 8.

As described above, the impurity processing device 100 according to the present embodiment includes the pipe 102 through which the treated liquid containing the metal impurities flows, the first electrode 108 and the second electrode 110 disposed in the pipe 102, and the power supply 106 that causes a current to flow between the first electrode 108 and the second electrode 110. The impurity processing device 100 according to the present embodiment causes a current to flow to the treated liquid to miniaturize or remove the metal impurities, so that even if the impurities are nonmagnetic metals, the impurities can be treated. Therefore, the treatment rate of the impurities can be increased. In addition, since a current flows through the treated liquid flowing through the pipe 102, it is possible to treat the metal impurities while conveying the treated liquid. In addition, the miniaturized metal impurities can be widely dispersed on the flow of the treated liquid.

As an example, the treated liquid is an electrode slurry containing a solvent and an electrode active material. The pipe 102 is provided in the coating apparatus 1 including the coating die 2 for applying the treated liquid to the coated material 16 and the tank 6 for storing the treated liquid. As a result, the impurity processing can be performed in the process of conveying the treated liquid from the tank 6 to the coating die 2. Further, by disposing the impurity processing device 100 in the feed pipe 10 or the die supply pipe 14 of the coating apparatus 1, it is possible to perform the impurity processing on the treated liquid until immediately before the treated liquid is applied to the coated material 16. Therefore, according to the impurity processing device 100 of the present embodiment, the performance of an electronic device can be enhanced.

In addition, the impurity processing device 100 can be attached to an existing apparatus only by using a part of a pipe in the apparatus as the pipe 102 or replacing a part of the pipe with the pipe 102 of the impurity processing device 100. Therefore, it is easy to install, replace, and maintain the impurity processing device 100.

In addition, in the impurity processing device 100 of the present embodiment, the first electrode 108 is provided in the pipe 102, and the second electrode 111) is provided in the rod-shaped body 112 inserted into the pipe 102. As a result, the structures of the first electrode 108 and the second electrode 110 can be simplified. The rod-shaped body 112 is a hollow body, a solid body, or a cylindrical mesh. When the rod-shaped body 112 is a hollow body or a solid body, it is possible to suppress an increase in pressure loss when the treated liquid passes through the pipe 102. When the rod-shaped body 112 is a cylindrical mesh, the contact area between the second electrode 110 and the treated liquid can be increased to increase the treatment rate of impurities.

Second Embodiment

A second embodiment has a configuration common to the first embodiment except for the arrangement of a first electrode 108 and a second electrode 110. Hereinafter, the present embodiment will be described focusing on a configuration different from that of the first embodiment, and the common configuration will be briefly described or description thereof will be omitted.

Figure 3A:
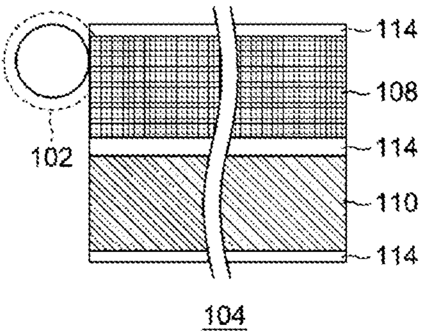
FIG. 3A is a schematic diagram of an electrode portion included in an impurity processing device according to a second embodiment.
Figure 3B:
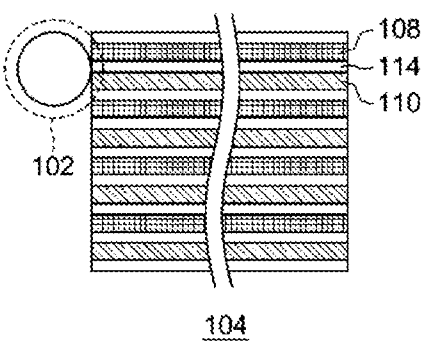
FIG. 3B is a schematic diagram of an electrode portion included in the impurity processing device according to second embodiment.
Figure 3C:
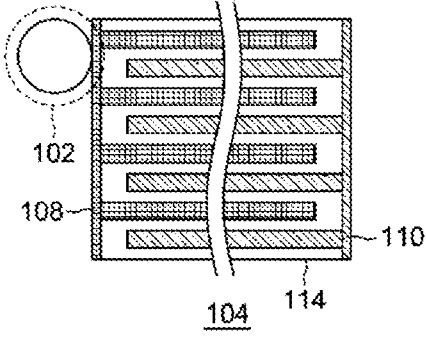
FIG. 3C is a schematic diagram of an electrode portion included in the impurity processing device according to the second embodiment.
Figure 3D:
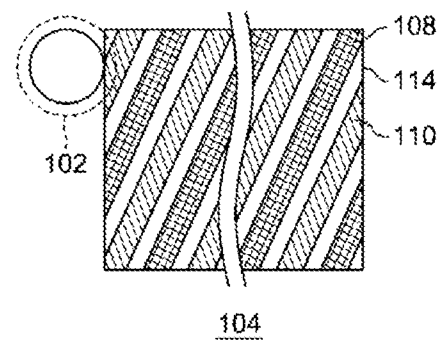
FIG. 3D is a schematic diagram of an electrode portion included in the impurity processing device according to the second embodiment.
Figure 3E:
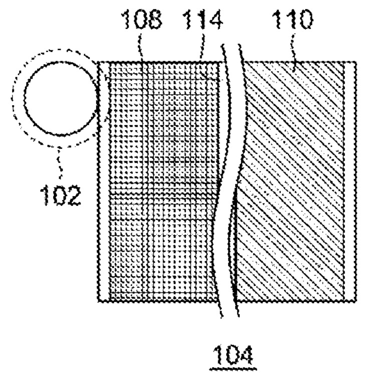
FIG. 3E is a schematic diagram of an electrode portion included in the impurity processing device according to the second embodiment.
Figure 3F:
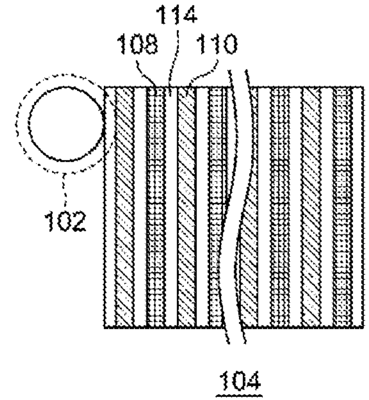
FIG. 3F is a schematic diagram an electrode portion included in the impurity processing device according to the second embodiment.

FIGS. 3A to 3F are schematic diagrams of an electrode portion 104 included in an impurity processing device 100 according to the second embodiment. FIG. 3A is a fourth example of the electrode portion 104, FIG. 3B is a fifth example of the electrode portion 104, FIG. 3C is a sixth example of the electrode portion 104, FIG. 3D is a seventh example of the electrode portion 104, FIG. 3E is an eighth example of the electrode portion 104, and FIG. 3F is a ninth example of the electrode portion 104. In addition, FIGS. 3A to 3F illustrate a state in which an inner wall of a pipe 102 is developed.

In the electrode portion 104 of the present embodiment, the first electrode 108 and the second electrode 110 are provided in the pipe 102. The first electrode 108 and the second electrode 110 are provided at least on the inner wall of the pipe 102. Note that the first electrode 108 and the second electrode 110 may be provided only on a surface of the inner wall of the pipe 102 or may be provided even inside the inner wall. In addition, an insulating portion 114 is provided between the first electrode 108 and the second electrode 110. The first electrode 108 and the second electrode 110 are electrically insulated by the insulating portion 114.

In the fourth example illustrated in FIG. 3A, the first electrode 108 is laid in a region of approximately ½ in a circumferential direction on the inner wall of the pipe 102, and the second electrode 110 is laid in the remaining region of approximately ½. The first electrode 102 and the second electrode 110 extend in a flow direction of a treated liquid. In the fifth example illustrated in FIG. 3B, plurality of first electrodes 108 and a plurality of second electrodes 110 extending in the flow direction of the treated liquid are alternately arranged in the circumferential direction of the inner wall of the pipe 102. The fourth example and the fifth example have a structure in which the first electrode 108 and the second electrode 110 are arranged in a stripe shape. In the fifth example, areas of the respective electrodes are small and laying patterns of the respective electrodes are dense, as compared with the fourth example. Therefore, the fifth example can be suitably adopted for the pipe 102 having a larger inner diameter than the fourth example.

In the sixth example illustrated in FIG. 3C, the first electrode 108 and the second electrode 110 have a comb tooth shape and are laid so as to mesh with each other. In the seventh example illustrated in FIG. 3D, the first electrode 108 and the second electrode 110 are laid in a spiral shape.

In the eighth example illustrated in FIG. 3E, the first electrode 108 is laid in a region of approximately ½ in the flow direction of the treated liquid on the inner wall of the pipe 102, and the second electrode 110 is laid in the remaining region of approximately ½. The first electrode 108 and the second electrode 110 extend in the circumferential direction of the pipe 102. In the ninth example illustrated in FIG. 3F, a plurality of first electrodes 108 and a plurality of second electrodes 110 extending in the circumferential direction of the pipe 102 are alternately arranged in the flow direction of the treated liquid. In the eighth example and the ninth example, the first electrode 108 and the second electrode 110 have a ring shape. In the ninth example, areas of the respective electrodes are small and laying patterns of the respective electrodes are dense, as compared with the eighth example. Therefore, the ninth example can be suitably adopted for the electrode portion 104 which is long in the flow direction of the treated liquid as compared with the eighth example.

Figure 4A:
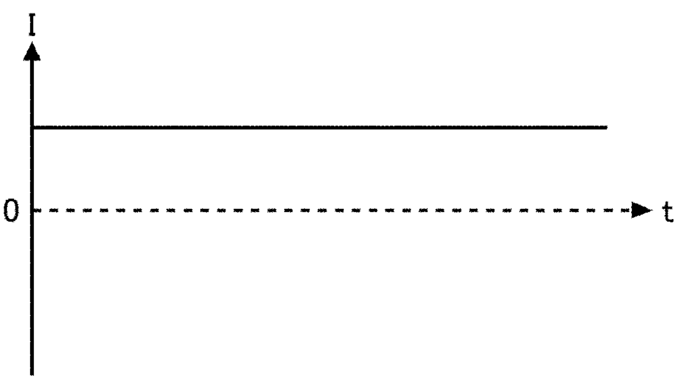
FIG. 4A is a diagram illustrating a specific example of a current flowing from a power supply between a first electrode and a second electrode.
Figure 4B:
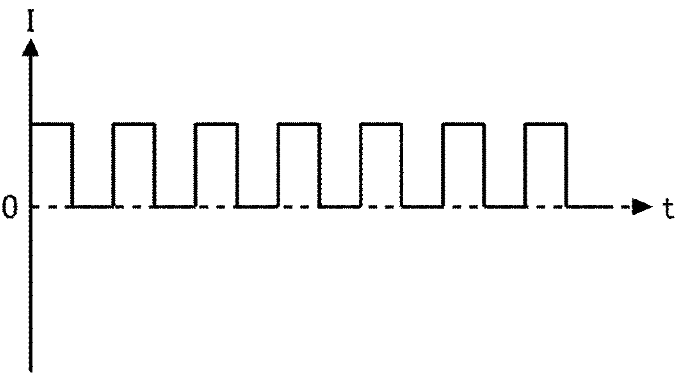
FIG. 4B is a diagram illustrating a specific example of a current flowing from the power supply between the first electrode and the second electrode.
Figure 4C:
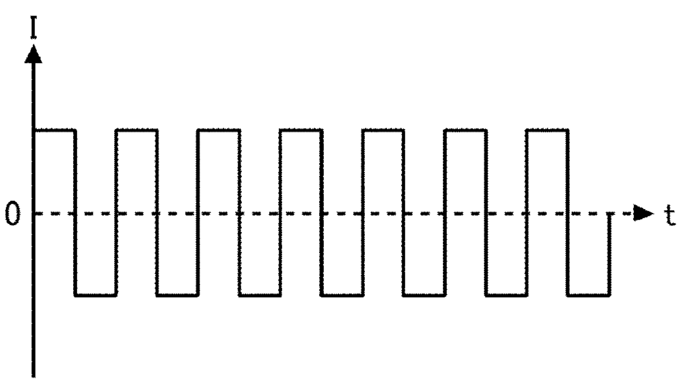
FIG. 4C is a diagram illustrating a specific example of a current flowing from the power supply between the first electrode and the second electrode.
Figure 4D:
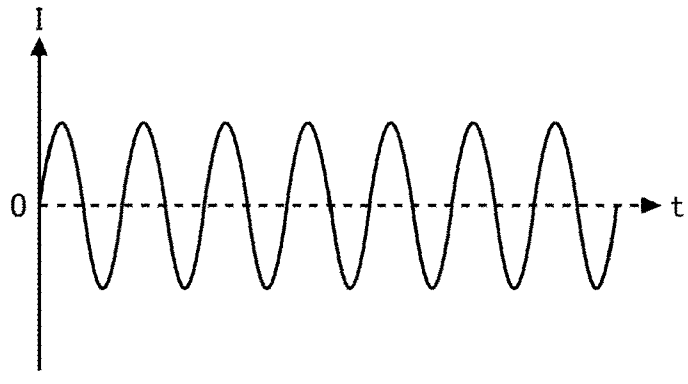
FIG. 4D is a diagram illustrating a specific example of a current flowing from the power supply between the first electrode and the second electrode.

Hereinafter, a current flowing from a power supply 106 between the first electrode 108 and the second electrode 110 will be described in detail. FIGS. 4A to 4D are diagrams illustrating specific examples of the current flowing from the power supply 106 between the first electrode 108 and the second electrode 110. FIG. 4A illustrates an example in which a constant current (continuous current) direct current flows, FIG. 4B illustrates an example in which an intermittent current of direct current flows, FIG. 4C illustrates an example in which a rectangular wave current flows, and FIG. 4D illustrates an example in which a sinusoidal current flows.

The intermittent current illustrated in FIG. 4B is a current that periodically switches between a period in which the current is energized and a period in which the current is cut off. Hereinafter, an intermittent current with a duty ratio of 50% (a ratio of the on-period to the off-period is 1:1) is assumed. The intermittent current with the duty ratio of 50% corresponds to a rectangular wave current of direct current with a lower current value of 0 A.

The rectangular wave current illustrated in FIG. 4C may be an alternating current that changes in positive and negative symmetry with 0 V as the center, or may be an alternating current or a direct current in which a center voltage becomes a voltage other than 0 V by application of a bias voltage. When an entire waveform of the rectangular wave current falls within a positive region or a negative region, a direction of the current does not change, and the rectangular wave current becomes a direct current. Similarly, the sinusoidal current illustrated in FIG. 4D may be an alternating current that changes in positive and negative symmetry with 0V as the center, or may be an alternating current or a direct current in which a center voltage becomes a voltage other than 0 V by application of a bias voltage.

The power supply 106 applies an electric field to a solid-liquid mixture (for example, an electrode slurry) for forming an electrode of an electric storage device by causing a current of 0.1 mA of more to flow between the first electrode 108 and the second electrode 110. An upper limit value of the current flowing between the first electrode 108 and the second electrode 110 is set to 100 mA in a case of a facility (for example, an unmanned factory) in which the risk of electric shock does not need to be considered. In a case of a facility where it is necessary to consider the risk of electric shock, the upper limit value is set to 10 to 12 mA.

The values of the intermittent current, the rectangular wave current, and the sinusoidal current are defined by effective values. An effective value Irms of the current can be calculated by taking a square root of a cycle average of a value obtained by squaring an instantaneous value I(t) as shown in the following (Formula 1).

$$I\,\mathrm{rms}=\sqrt{(1/T\cdot\int I(t)^2 dt)} \quad \text{(Formula 1)}$$

Note that the effective value Irms of the sinusoidal current can also be calculated by 1/√2 of maximum value Im of the sinusoidal current as shown in the following (Formula) 2).

$$I\,\mathrm{rms}=Im/\sqrt{2} \quad \text{(Formula 2)}$$

Figure 5:
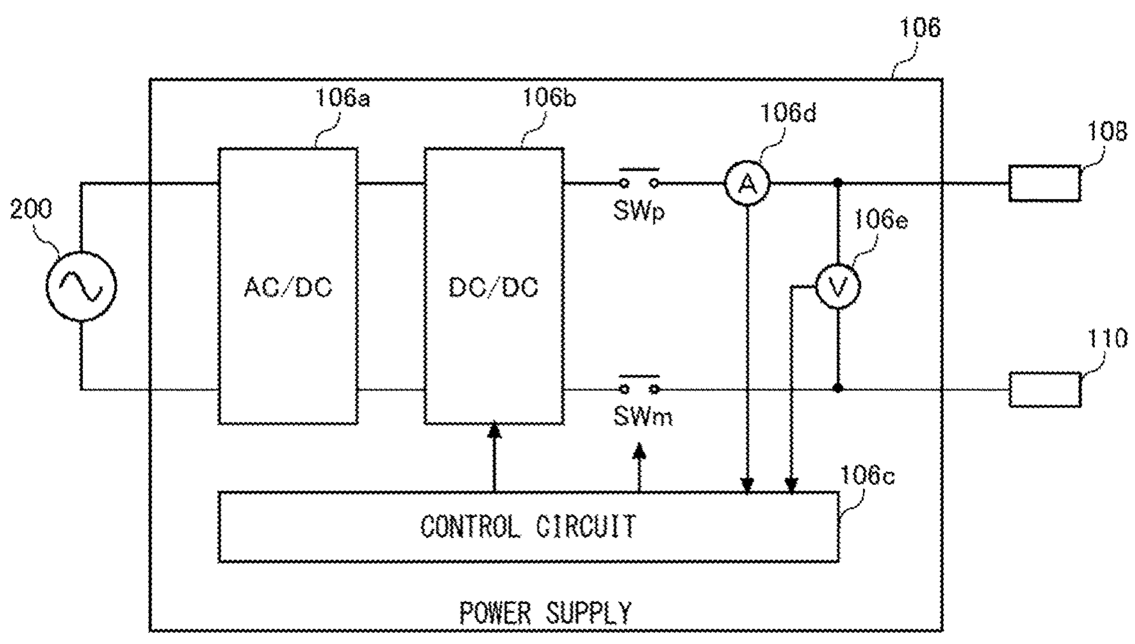
FIG. 5 is a diagram illustrating a first configuration example of the power supply.

FIG. 5 is a diagram illustrating a first configuration example of the power supply 106. The power supply 106 includes an AC/DC converter 106*a*, a DC/DC converter 106*b*, control circuit 106*c*, a current sensor 106*d*, a voltage sensor 106*e*, a switch SWp, and a switch SWm. The AC/DC converter 106*a* converts, AC power supplied from a commercial power system 200 into DC power. The DC/DC converter 106*b* can convert the voltage or current of the DC power supplied from the AC/DC converter 106*a* into another value and output the converted value. The switch SWp and the switch SWm are switches for conducting or cutting off between the DC/DC converter 106*b* and the solid-liquid mixture between the first electrode 108 and the second electrode 110. A relay or a semiconductor switch can be used in the switch SWp and the switch SWm.

The current sensor 106*d* measures a current flowing between the first electrode 108 and the second electrode 110, and outputs the measured current to the control circuit 106*c*. The voltage sensor 106*e* measures a voltage between the first electrode 108 and the second electrode 110, and outputs the measured voltage to the control circuit 106*c*.

The control circuit 106*c* can include, for example, a microcomputer. The control circuit 106*c* controls a switching element included in the DC/DC converter 106*b* so that the current value measured by the current sensor 106*d* maintains a target value. When an on time of the switching element is lengthened, the current value output from the DC/DC converter 106*b* can be increased, and when the on time is shortened, the current value output from the DC/DC converter 106*b* can be decreased. The target value of the Current is set by the control device 107. As described above, in the present disclosure, current control for maintaining the current value output from the DC/DC converter 106*b* at the target value is executed.

The control circuit 106*c* can output the constant current (continuous current) illustrated in FIG. 4A by fixing the switch SWp and the switch SWm to an on state. In addition, the control circuit 106*c* can output the intermittent current illustrated in FIG. 4B by turning on/off at least one of the switch SWp or the switch SWm at a set cycle (which may be considered as a frequency). The cycle (frequency) is also set by the control device 107.

Figure 6:
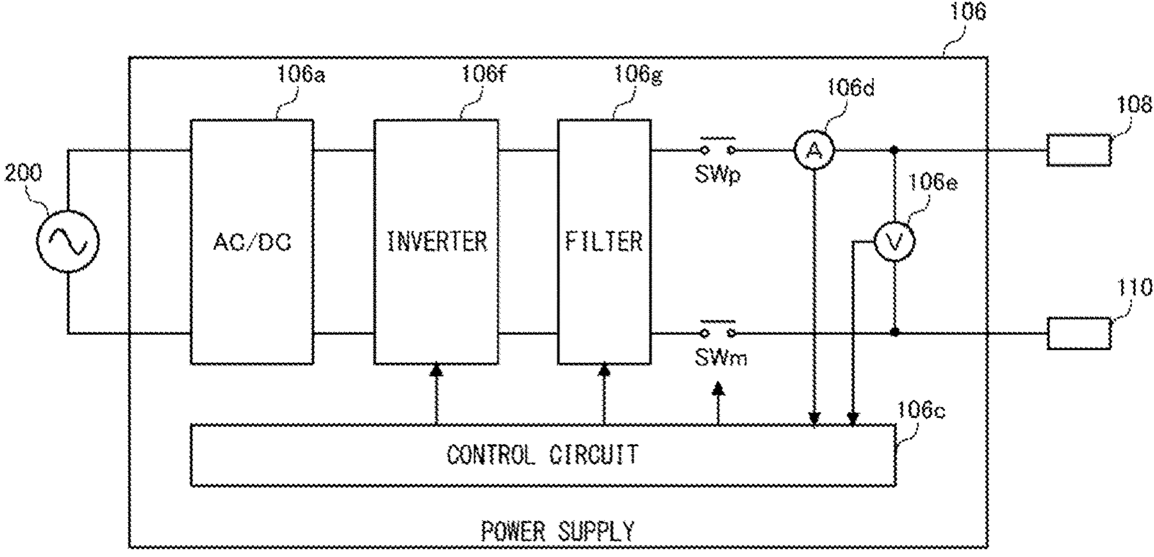
FIG. 6 is a diagram illustrating a second configuration example of the power supply.

FIG. 6 is a diagram illustrating a second configuration example of the power supply 106. The power supply 106 includes an AC/DC converter 106*a*, an inverter 106*f*, a filter 106*g*, a control circuit 106*c*, a current sensor 106*d*, a voltage sensor 106*e*, a switch SWp, and a switch SWm. Hereinafter, description overlapping with the description of the first configuration example will be appropriately omitted.

The inverter 106*f* includes a plurality of bridge-connected switching elements, and converts DC power supplied from the AC/DC converter 106*a* into power of an AC rectangular wave with 0 V as the center. The filter 106*g* includes, for example, an LC filter, and can shape the waveform of the rectangular wave output from the inverter 106*f*.

The control circuit 106*c* controls on/off of the plurality of switching elements included in the inverter 106*f* at the set frequency, and controls a duty ratio of the plurality of switching elements so that the current value measured by the current sensor 106*d* maintains the target value. The control circuit 106*c* can output the rectangular wave current illustrated in FIG. 4C by disabling the filter 106*g*. In addition, the control circuit 106*c* can also shape the rectangular wave output from the inverter 106*f* into a sine wave by enabling the filter 106*g* and output the sinusoidal current illustrated in FIG. 4D.

Figure 7:
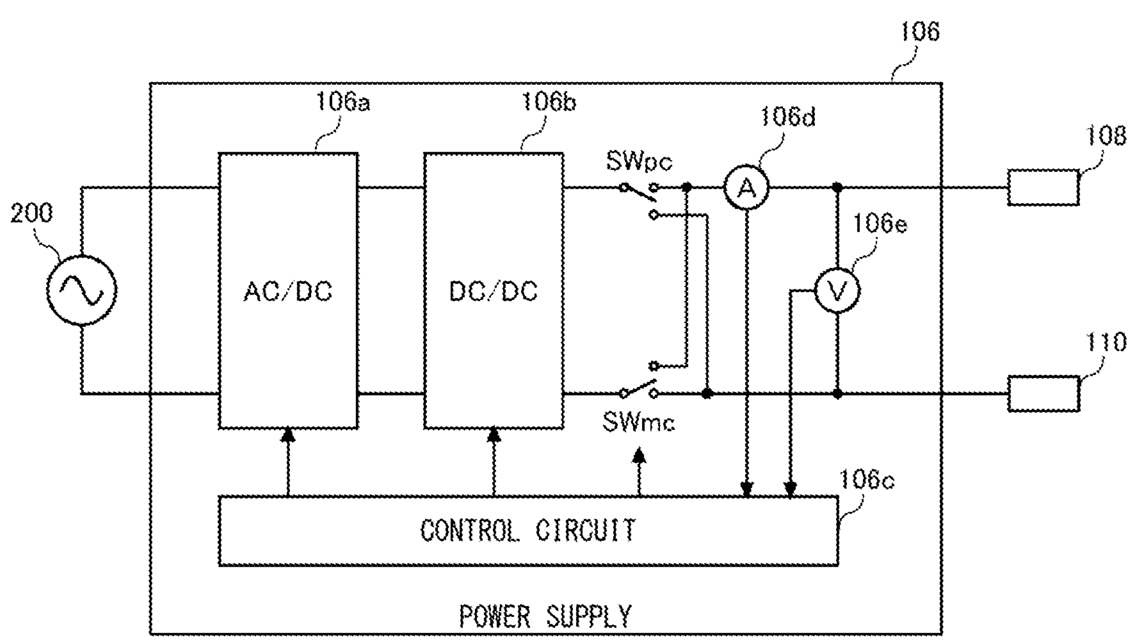
FIG. 7 is a diagram illustrating a third configuration example of the power supply.

FIG. 7 is a diagram illustrating a third configuration example of the power supply 106. The configuration of the power supply 106 illustrated in FIG. 7 is a configuration in which the switch SWp and the switch SWm of the configuration of the power supply 106 illustrated in FIG. 5 are replaced with a C contact switch SWpc and a C contact switch SWmc, respectively. The positive-side C cos switch SWpc is a switch for selectively switching the connection destination of the positive-side output terminal of the DC/DC converter 106*b* between the first electrode 108 and the second electrode 110. The negative-side C contact switch SWmc is a switch for selectively switching the connection destination of the negative side output terminal of the DC/DC converter 106*b* between the first electrode 108 and the second electrode 110.

In a first state in which the positive-side C contact switch SWpc selects the first electrode and the negative-side C contact switch SWmc selects the second electrode 110, a current in a positive direction flows from the DC/DC converter 106*b* to the solid-liquid mixture. In contrast, in a second state in which the positive-side C contact switch SWpc selects the second electrode 110 and the negative-side C contact switch SWmc selects the first electrode 108, current in a negative direction flows from the DC/DC converter 106*b* to the solid-liquid mixture. The control circuit 106*c* can output the rectangular wave current illustrated in FIG. 4C by alternately switching the positive-side C contact switch SWpc and the negative-side C contact switch SWmc between the first state and the second state at a set frequency.

The control circuit 106*c* may transmit the current value acquired from the current sensor 106*d* and the voltage value acquired from the voltage sensor 106*e* to the control device 107. The control device 107 may display the waveform of the current value and the waveform of the voltage value acquired from the control circuit 106*c* on an oscilloscope. In this case, an operator of the coating apparatus 1 can monitor the current and the voltage applied to the solid-liquid mixture in real time.

When an abnormality occurs in at least one of the waveform of the current value or the waveform of the voltage value, the application of the current to the solid-liquid mixture may be stopped by the operation of the operator or an operating program in the control device 107. Even when the waveform of the voltage value becomes a waveform indicating that the impurities contained in the solid-liquid mixture are miniaturized to have a size smaller than a reference value, the application of the current to the solid-liquid mixture may be stopped the operation of the operator or the operating program in the control device 107.

FIG. 8 is a diagram illustrating experimental data when various kinds of currents are caused to flow to a solid-liquid mixture for one hour. In this experiment, a solid-liquid mixture containing a copper wire as a metal foreign substance was disposed between the first electrode 108 and the second electrode 110. A change in the mass of the copper wire before and after the current was caused to flow to the solid-liquid mixture was measured. In a graph of FIG. 8, for the presence or absence of copper elution, case where there is a mass decrease of 0.1 mg or more described as "presence", and a case where there is no mass decrease is described as "absence". For the presence or absence of alteration of the solid-liquid mixture, results of visually confirming the presence or absence of a state change of the solid-liquid mixture after causing a current to flow to the solid-liquid mixture for one hour are described. Specifically, a case where there is an alteration product on a mesh after a mesh path is described "presence", and a case where there is no alteration product is described as "absence". For example, when the viscosity changes due to gelation of the solid-liquid mixture or a change in volume or solid content ratio, the alteration product may remain on the mesh.

A voltage value depends on the conductivity (which may be considered as resistance) of the solid-liquid mixture and the distance (hereinafter, referred to as the inter-electrode distance) between the first electrode 108 and the second electrode 110. Even when the same current is applied, the voltage value increases as the resistance of the solid-liquid mixture increases. In addition, even when the same current is applied, the voltage value increases as the inter-electrode distance increases.

An amount of electricity (charge) applied to the solid-liquid mixture is defined by the product of a current and a time. In an SI unit system, the amount of electricity is defined by coulomb C, which is constituted by the product [A·s] of amperes A and second s. An elution amount of copper is proportional to the amount of electricity to be applied. Therefore, the elution amount of copper increases as the current value increases. In addition, the elution amount of copper increases as the current flow time is lengthened. However, when the amount of electricity applied to the solid-liquid mixture becomes excessive, the risk that the solid-liquid mixture is altered increases.

In the example illustrated in FIG. 8, alteration of the solid-liquid mixture was confirmed when a current of 3 mA was continuously applied for one hour. Note that even when the current of 3 mA was applied for one hour, the alteration of the solid-liquid mixture was not confirmed at the time of applying the current with an intermittent current. In addition, even when a rectangular wave current of 1 mA was applied at a frequency of 0.01 Hz for one hour, the alteration of the solid-liquid mixture was confirmed. In addition, even when a sinusoidal current of 1 mA was applied at a frequency of 0.01 Hz for one hour, the alteration of the solid-liquid mixture was confirmed.

When a rectangular wave current of 1 mA was applied at a frequency of 0.1 Hz for one hour, the alteration of the solid-liquid mixture was not confirmed. Even when a sinusoidal current of 1 mA was applied at a frequency of 0.1 Hz for one hour, the alteration of the solid-liquid mixture was not confirmed.

FIG. 5 is a diagram plotting a relation between amount of electricity [C] applied to the solid-liquid mixture and an elution amount [mg] of copper. In each of four cases of applying a sinusoidal current at a frequency of 10 mHz, applying a sinusoidal current at a frequency of 100 mHz, applying a sinusoidal current at a frequency of 1 Hz, and applying a sinusoidal current at a frequency of 60 Hz when a constant current of direct current (DC) is applied, a plurality of pieces of sample data were collected, and linear regression was performed in each of the cases. The steeper the slope of the regression line, the faster the copper elution rate.

Figure 9:
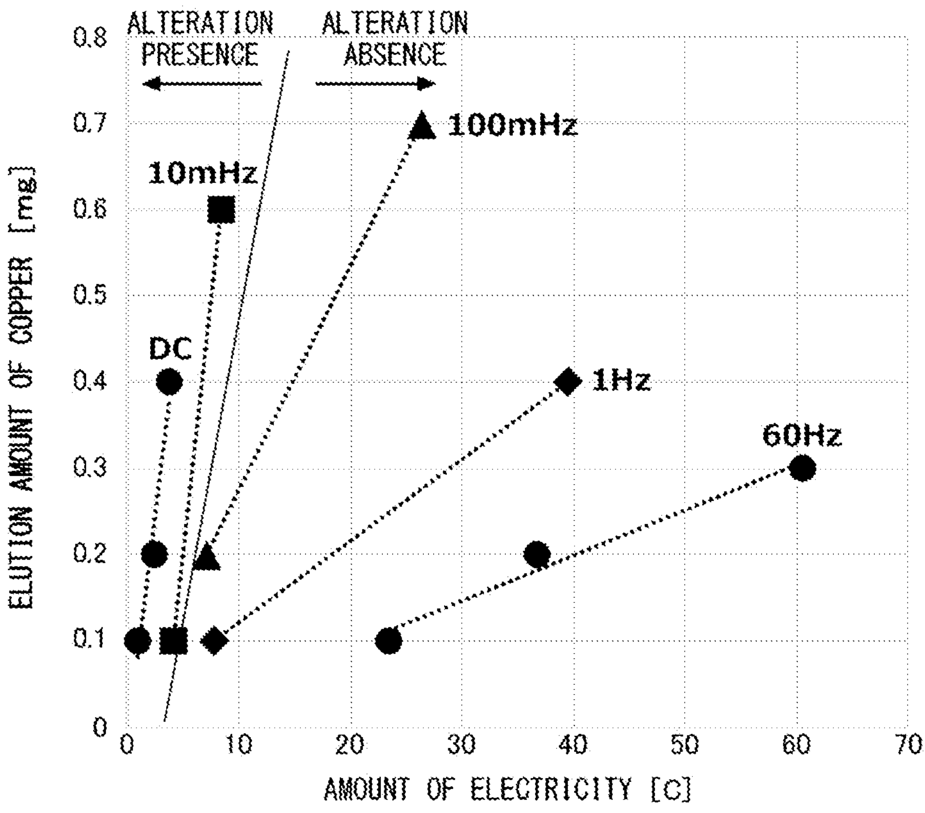
FIG. 9 is a diagram plotting a relation between an amount of electricity applied to a solid-liquid mixture and an elution amount of copper.

As can be seen from FIG. 9, as the frequency increases, the alteration of the solid-liquid mixture is less likely to occur. It can be seen that the amount of electricity [C] needs to be reduced when a constant current of direct current (DC) is applied. For example, a time for which the constant current is continuously applied is preferably 100 seconds or less. When the sinusoidal current is applied, the sinusoidal current is preferably applied at a frequency higher than 10 mHz.

According to another experiment by the present inventors, it was confirmed that copper as a foreign substance can be detoxified without causing alteration of the solid-liquid mixture by applying an amount of electricity of 1 C or more to the solid-liquid mixture by applying a current of 0.1 mA or more between the first electrode 108 and the electrode 110. In order to detoxify copper, it is necessary to miniaturize it to a size of 30 μm or less. When electric melting efficiency is 33%, 1 C corresponds to the amount of electricity required to miniaturize a φ 100 μm copper ball (×22) into a φ 30 μm copper ball.

The electric melting efficiency indicates a ratio at which the amount of electricity applied is used for dissolving the foreign substance, and when the entire amount of electricity applied is used for dissolving the foreign substance, the electric melting efficiency is 100%. Normally, the entire amount of electricity applied is not used for dissolution of the foreign substance, and most of the amount of electricity is used for conversion of heat or the like.

The Faraday constant F is a universal constant representing an amount of electricity of 1 mol of a group of charged particles of the elementary charge e, and is represented by $F \approx 9648.5$ C/mol. The Faraday constant F equal to the amount of electricity required to deposit 1 mol of monovalent ions by electrolysis. The number of moles can be calculated from the amount of electricity [C] by the Faraday constant F, and the dissolved mass of copper as the foreign substance can be obtained as the substance amount.

In still another experiment by the present inventors, a relation between the inter-electrode distance t [mm] and the voltage [V] applied to the solid-liquid mixture was linearly regressed in the form of $V=\alpha t+\beta$. When a nonaqueous solvent was used, regression to an equation of $V=1.2\ t+3$ was possible. In a case of using an aqueous solvent, regression to an equation of $V=1.15\ t+1.5$ was possible. The decomposition voltage of the nonaqueous solvent is largely concentrated around 3 V, and the decomposition voltage of the aqueous solvent is 1.5 V. Therefore, regardless of which solvent is used, the voltage between the electrodes when the current is applied is equal to or higher than the decomposition voltage of the solvent. That is, the voltage is 3 V or higher in a case of the nonaqueous solvent, and the voltage is 1.5 V or higher in the case of the aqueous solvent. Note that in the experimental data illustrated in FIG. 8, the voltage value between the electrodes was equal to or higher than the decomposition voltage of the solvent, even when any current is applied. Even when a current of 0.1 mA was continuously applied for one hour, the voltage value between the electrodes was 14 V, which was equal to or higher than the decomposition voltage of the solvent.

The solid-liquid mixture containing metal impurities can be regarded as pseudo bipolar electrolysis having electrolysis between electron conductive particles present innumerably in the solid-liquid mixture. Therefore, the voltage applied to the solid-liquid mixture is the sum of the respective voltages between the respective particles present in the solid-liquid mixture. Each electrolytic voltage between the particles does not reach the decomposition voltage of the solvent, and even if the apparent voltage between the electrodes exceeds the decomposition voltage of the solvent, the solvent is not actually decomposed. Therefore, the metal impurities contained in the solid-liquid mixture can be miniaturized without reducing the solvent.

In the above embodiment, the example has been described in which a current is caused to flow to the solid-liquid mixture flowing through the pipe 102 in the coating apparatus 1. In this regard, the timing of applying the current to the solid liquid mixture may be timing in a step before the solid-liquid mixture is put into the tank 6 of the coating apparatus 1. For example, a current may be applied in the mixing/stirring/kneading process. In that case, electrodes are provided in a container having blades for mixing, stirring, and kneading, and a current is applied between the electrodes during the preparation of the solid-liquid mixture the container. Note that the current may be applied during a period in which the blades in the container are turning, or the current may be applied during a period in which the blades are not turning. In addition, after the preparation of the solid-liquid mixture, the current may be applied during a period during which the solid-liquid mixture is stored in another container before being put into the tank 6 of the coating apparatus 1. As such, the current may be applied in a state in which the solid-liquid mixture is stationary.

The embodiments of the present disclosure have been described above in detail. The above-described embodiments are merely specific examples for carrying out the present disclosure. The contents of the embodiments do not limit the technical scope of the present disclosure, and many design changes such as changes, additions, and deletions of components can be made without departing from the spirit of the present disclosure defined in the claims. A new embodiment to which the design change is made has the effect of the combined embodiment and modifications. In the above-described embodiments, the contents that can be changed in design are emphasized with notations such as "of the present embodiment" and "in the present embodiment", but the design change is allowed even in the contents without such notations. Any combination of the above components also effective as an aspect of the present disclosure. The hatching applied to the cross sections of the drawings does not limit the material of the hatched target.

The invention according to the above-described embodiment may be specified by an item described below.

Item 1

An impurity processing device (100) including:

a pipe (102) through which a treated liquid containing metal impurities flows;

a first electrode (108) and a second electrode (110) disposed in the pipe (102); and a power supply (106) causing a current of 1 mA or more to flow between the first electrode (108) and the second electrode (110).

What is claimed is:

1. An impurity processing method for processing metal impurities contained in a solid-liquid mixture for forming an electrode of an electric storage device, the impurity processing method comprising:

providing a first electrode and a second electrode configured to apply an electric field to the solid-liquid mixture, applying an amount of electricity of 1 C or more to the solid-liquid mixture by causing a current of 0.1 mA or more to flow between the first electrode and the second electrode via the solid-liquid mixture, wherein the solid-liquid mixture is an electrode slurry containing a solvent and an electrode active material, wherein a voltage V, in volt, between the first electrode and the second electrode at a current of 0.1 mA or more flowing between the first electrode and the second electrode, and a distance t, in mm, between the first electrode and the second electrode, and wherein t is greater than 0, satisfy:

$V=1.2t+3$, where the solvent is a nonaqueous solvent; and $V=1.15t+1.5$, where the solvent is an aqueous solvent.

* * * * *